United States Patent
Chalana et al.

(10) Patent No.: US 12,451,213 B2
(45) Date of Patent: Oct. 21, 2025

(54) OPTIMIZED HANDLING OF NEIGHBOR PLANE DISTURB ISSUES

(71) Applicant: Sandisk Technologies, Inc., Milpitas, CA (US)

(72) Inventors: Robin Chalana, Bengaluru (IN); Ravi Dutt Sharma, Bengaluru (IN); Iyan Karkuvel Rajan Ayyathurai, Bengaluru (IN)

(73) Assignee: Sandisk Technologies, Inc., Milpitas, CA (US)

( * ) Notice: Subject to any disclaimer, the term of this patent is extended or adjusted under 35 U.S.C. 154(b) by 134 days.

(21) Appl. No.: 18/581,730

(22) Filed: Feb. 20, 2024

(65) Prior Publication Data
US 2025/0266119 A1    Aug. 21, 2025

(51) Int. Cl.
*G11C 29/00* (2006.01)
*G11C 29/12* (2006.01)
*G11C 29/38* (2006.01)

(52) U.S. Cl.
CPC ........ *G11C 29/886* (2013.01); *G11C 29/1201* (2013.01); *G11C 29/38* (2013.01)

(58) Field of Classification Search
CPC .... G11C 29/886; G11C 29/1201; G11C 29/38
See application file for complete search history.

(56) References Cited

U.S. PATENT DOCUMENTS

| 2012/0072807 A1* | 3/2012 | Cornwell | G06F 11/0748 714/E11.055 |
| 2024/0143192 A1* | 5/2024 | Kim | G06F 3/0619 |

* cited by examiner

*Primary Examiner* — Han Yang
(74) *Attorney, Agent, or Firm* — DENTONS Durham Jones Pinegar

(57) ABSTRACT

Memory blocks of a metablock are analyzed and tested to determine whether multiple memory blocks fail a first fault assessment. If more than one memory block fails the first fault assessment, the memory blocks are assigned to a retry pool. When in the retry pool, a second fault assessment is performed on the memory blocks. If one or more of the memory blocks pass the second fault assessment, the memory blocks are placed in a memory block pool and are relinked to other memory blocks to form a new metablock. However, if one or more of the memory blocks fail the second fault assessment, the memory blocks are retired.

20 Claims, 6 Drawing Sheets

OPTIMIZED HANDLING OF NEIGHBOR PLANE DISTURB ISSUES

BACKGROUND

Semiconductor memory and storage devices are widely used in various electronic devices such as cellular telephones, digital cameras, personal digital assistants, medical devices, mobile computing devices, and non-mobile computing devices. Semiconductor memory may include non-volatile memory or volatile memory. A non-volatile memory allows information to be stored and retained even when the non-volatile memory is not connected to a power source (e.g., a battery). Examples of non-volatile memory include flash memory (e.g., NAND-type and NOR-type flash memory) and Electrically Erasable Programmable Read-Only Memory (EEPROM).

Typically, a memory system includes one or more memory dies. Each of the one or more memory dies includes one or more memory planes, each consisting of a plurality of memory blocks. During programming of the memory system, a controller of the memory system performs programming operations (e.g., read operations, write operations, other suitable operations, or a combination thereof) on pages of a memory block according to commands received by the controller.

However, memory blocks are susceptible to failures. For instance, a failed memory block may have one or more invalid bits whose reliability is not guaranteed. Bad memory blocks may be present when a device is shipped or may develop during the lifetime of the device. Regular maintenance processes, such as garbage collection operations, may be used to identify and remove faulty blocks. A conventional approach may include a single plane erase operation that is performed on each individual plane by marking each block that fails. This single plane erase approach is thorough but may incur a relatively lengthy erase time.

Multiplane erase pass operations are used to perform erase functions more quickly than single erase operations. However, the faster processing times provided by multiplane erase pass operations may be accompanied by their own complications. For instance, a neighbor plane disturb error may occur during a multiplane erase operation. Such an error may arise when one plane is legitimately faulty due to a physical defect, and erase statuses of each of its neighboring planes are misidentified as being erase failures, despite being non-faulty. The erroneous designations result in useful blocks being prematurely retired instead of reused. Such misclassifications and retiring may represent an "overkill" that negatively impacts production output efficiency.

Accordingly, it would be beneficial to recover blocks that have been erroneously found to be faulty during a fault assessment.

SUMMARY

The present application describes a data storage device that includes a fault assessment system. In an example, the fault assessment system determines whether memory blocks of a metablock are faulty or whether at least one of the memory blocks was mischaracterized or misclassified as being faulty due to a neighboring memory block being faulty. For example, if the fault assessment system determines that more than one memory block of a metablock has failed a first fault assessment, the fault assessment system may determine that there is a possibility that a legitimately failing block may inaccurately cause functional block to also appear to be failing.

In such an example, the fault assessment system assigns the memory blocks of the metablock, or assigns the two (or more) failed memory blocks of the metablock, to a retry pool. In an example, the fault assessment system performs a second fault assessment on the memory blocks that are assigned to the retry pool. If memory blocks in the retry pool are determined to be functional, the memory block may be linked (or relinked) to other functional memory blocks to form new metablocks. However, if a memory block fails the second fault assessment, the memory block is retired.

Accordingly, examples of the present disclosure describe a data storage device that includes at least one memory die and a controller communicatively coupled to the at least one memory die. In an example, the controller is operable to access a metablock of the at least one memory die. In an example, the metablock includes a plurality of memory blocks. The controller also determines whether two or more memory blocks of the plurality of memory blocks have failed a first fault assessment. Based, at least in part, on determining the two or more memory blocks have failed the first fault assessment, the controller assigns at least the two or more memory blocks of the plurality of memory blocks to a retry pool. The controller then performs a second fault assessment on the at least the two or more memory blocks of the plurality of memory blocks assigned to the retry pool. The controller can then make a fault determination on each of the at least the two or more memory blocks based, at least in part, on the second fault assessment.

Additional examples describe a data storage device that includes a means for accessing a metablock of at least one memory die. In an example, the metablock includes a plurality of memory blocks. The data storage device also includes a means for determining whether at least two memory blocks of the plurality of memory blocks fail a first fault assessment and a means for assigning the at least two memory blocks of the plurality of memory blocks to a retry pool. In an example, the data storage device also includes a means for performing a second fault assessment on at least one memory block of the at least two memory blocks of the plurality of memory blocks assigned to the retry pool. The data storage device also includes a means for making a fault determination of the at least one memory block of the at least two memory blocks.

Other examples of the present disclosure describe a method that includes assigning a plurality of memory blocks to a retry pool. In an example, the plurality of memory blocks in the retry pool have failed a first test. A second test is performed on the plurality of memory blocks assigned to the retry pool. The method also includes linking the plurality of memory blocks together to create one or more new metablocks. In an example, each of the one or more new metablocks includes a set number of memory blocks. Additionally, the plurality of memory blocks are linked based, at least in part, on the second test.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
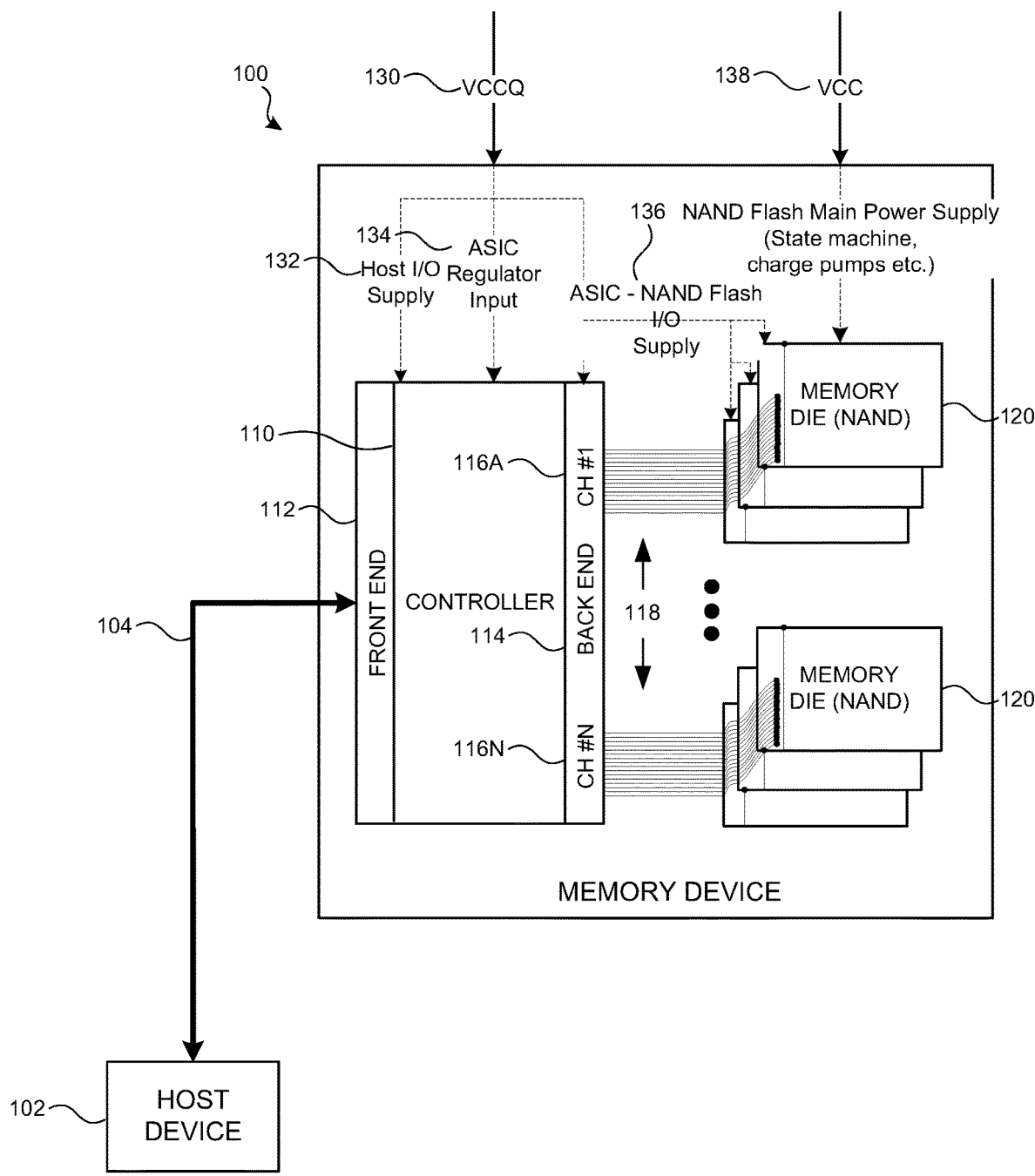
FIG. 1 is a component diagram of a memory device according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

An implementation of a system and associated processes accesses a metablock that includes multiple memory blocks to determine if more than one memory block fails a first fault assessment. The failure of multiple memory blocks suggests the possibility that a legitimately failing block may inaccurately cause another, functional block, to appear to also be failing (e.g., affecting its erase status). An example of a fault assessment includes a multiplanar erase pass operation.

An implementation of the system assigns the memory blocks of the metablock (or one or more memory blocks that comprise the metablock) to a retry pool in response to the metablock failing the first fault assessment. In an example, the system performs a second fault assessment on an individual memory block (or to a group of memory blocks) that was assigned to the retry pool. Processes may initiate a fault determination of the memory block based on the second fault assessment. Where the pooled, individual memory block is determined to be functional, the block may be relinked to memory data. For instance, the system combines memory blocks from the retry pool to form new metablocks. Alternatively, a pooled memory block that fails the erase operation is retired.

An example of the system increases performance speeds by executing erase operations as a system background function (e.g., when the system is idle), rather than as a foreground function. The system records more than one plane erase failure during a metablock erase operation. The system of an implementation retires a physical block of the metablock should only one block fail during a metablock erase. Where multiple memory blocks failed, the system retries an erase operation on the failed blocks during a garbage collection operation. The processes make the blocks available for dynamic relinking should they pass a single plane erase operation during garbage collection. Alternatively, the system retires a pooled block when it fails a single plane erase operation during the garbage collection operation. The system of an implementation sequences through blocks of the retry pool so long as enough time is available during the garbage collection operation.

In the case where the pooled memory blocks pass the single plane erase operation (e.g., second fault assessment), the retried memory blocks are erased during the garbage collection operation according preset, programmatic priorities. The erasure enables the pooled blocks to be made available for relinking. Alternatively, the pooled block is retired if it is determined to still be failing.

According to particular implementation that includes single level cell (SLC) blocks, SLC known erase sequences may be followed. Similarly for quad level cell (QLC) (e.g., four bits per cell), known QLC erase sequences should be followed. SLC blocks may be added to an SLC dynamic relinking pool, and QLC blocks may be added to a QLC dynamic relinking pool.

Accordingly, many technical benefits may be realized including, but not limited to enabling multiplane erase pass operations that perform erase functions more quickly than single erase operations, while reducing or eliminating occurrences neighbor plane disturb errors. As such, the error statuses of functioning, neighboring panes in an example are insulated from complications and misclassifications arising from a faulty memory block. As such, an example reduces the number of useful blocks being prematurely retired, instead of reused. In reducing memory block cull overkill, an example improves production output efficiency.

These various benefits and examples will be described in greater detail below with reference to FIG. 1-FIG. 7.

Turning more particularly to the drawings, FIG. 1 is a component diagram of a memory device 100 according to an example. In this example, the memory device 100 includes a controller 110 (e.g., an application-specific integrated circuit (ASIC)) and one or more memory dies 120 (e.g., utilizing NAND-type flash memory or such). The controller 110 manages input/output (I/O) operations between the memory device 100 and a host device 102 (e.g., a computing device such as, for example, a mobile phone, a desktop computer, a server computing device, a removable storage card, or the like). The controller 110 includes a front end module (or just "front end") 112 that is configured to broker various communication operations between the host device 102 and the memory device 100 (e.g., receiving I/O commands from the host device 102, transmitting associated responses, and the like). The controller 110 also includes a back end module (or just "back end") 114 that is configured to communicate with the various memory dies 120 included in the memory device 100.

In this example, the memory dies 120 are non-volatile, NAND-type flash memory devices that store and retrieve host data (also referred to herein as "user data"). These memory dies 120 may include 2D or 3D (e.g., stacked) NAND non-volatile memory (e.g., as a 2D or 3D array of memory cells) that define a memory structure that is addressable by wordlines using a decoder (e.g., row decoder) and by bit lines. Commands and data are transferred between the host device 102 and the controller 110 using a data bus 104, and between controller 110 and one or more of the memory dies 120 by way of lines 118. In one example, memory die 120 includes a set of input and/or output (I/O) pins that connect to lines 118.

The memory device 100 is powered by two power input lines, an I/O voltage (or VCCQ) 130, and a core voltage (or VCC) 138. The VCCQ 130 is used to provide a host I/O supply 132, an ASIC regulator input 134, and an ASIC-NAND flash I/O supply 136 to the controller 110. The VCC 138 provides a main power supply to the memory dies 120. In some examples, these inputs 130, 138 are provided by the host device 102, which may, as such, control power to the memory device 100.

In this example, the controller 110 logically organizes the NAND memory (e.g., all of the bits provided by cells of the memory dies 120) into memory blocks of a predetermined size (e.g., 4 megabytes (MBs), 16 MBs, 32 MBs, or the like). Each of these blocks includes multiple pages of a predetermined page size (e.g., 16 kilobytes (KBs), 32 KBs, 64 KBs, or the like), where all of the bits/cells for a particular page are all of the cells of a particular wordline. Such cells can be single-level cells (SLCs) (e.g., storing one bit per cell) or multi-level cells (MLCs) (e.g., storing more than one bit per cell). The inherent nature of NAND flash memory may include some limitations, such as performing an erase before writing/programming, data errors caused by write and read disturb, data retention errors, need for management of initial and runtime bad blocks, and other limitations known in the technology. In an example, a page is the smallest area of the memory dies 120 that supports a write operation and is performed on all of the memory cells on a particular wordline, a block is the smallest area of the memory dies 120 that supports an erase operation, and all properly erased bit store a value of '1' after the erase.

During operation, the memory device 100 receives I/O commands from the host device 102, such as read commands (e.g., commands for data already stored on the memory device 100), write commands (also sometimes referred to herein as "program commands" or "programming operations") (e.g., commands to write data to the memory device 100), and erase commands (e.g., commands to erase portions of data currently stored on the memory device 100), amongst others. The memory device 100, namely the controller 110, responds to each of these commands via subsequent operations conducted on the memory dies 120.

For write operations, the controller 110 and/or the host device 102 maintains and manages an open block table that identifies which memory blocks are currently in the midst of a write operation. For example, a particular memory block may be entered into the open block table when a write operation is initiated on that memory block, and that memory block may be cleared from the open block table when that operation is successfully completed. In some examples, the open block table may store LGP data (e.g., in clean graceful shut down situations, where the memory system has time to store an LGP for open blocks).

Each of the memory dies 120 include one or more memory blocks. In an example, each memory block includes one or more memory cells. A block of memory cells is the smallest number of memory cells that are physically erasable together. In an example and for increased parallelism, each of the blocks may be operated or organized in larger blocks, or metablocks. For example, one block from different planes (or the same planes) of memory cells may be logically linked together to form a metablock. As described herein, an illustrative metablock may include multiple (e.g., four) blocks.

Figure 2:
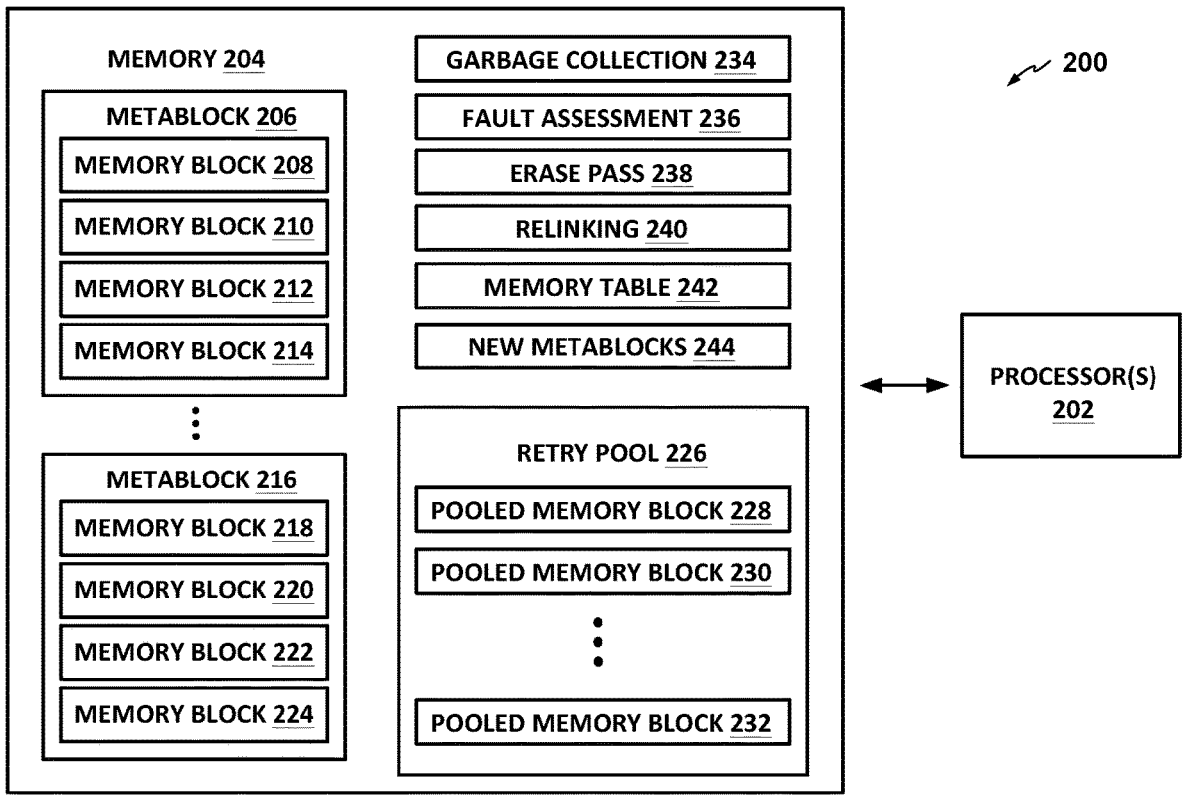
FIG. 2 is a block diagram of a system depicting illustrative components used to manage memory blocks by recovering or retiring the memory blocks using a retry pool and multiple erase operations according to an example.

FIG. 2 is a block diagram of a system 200 depicting illustrative components used to manage memory blocks by recovering or retiring them using a retry pool and multiple erase operations according to an example. One or more processors 202 may be the same or similar to the controller 110 of FIG. 1. An implementation of the processors 202 may include multiple processors positioned throughout a computing device and network.

As represented in the block diagram, the illustrative system 200 includes a memory 204 in communication with the processors 202. In an example, the memory 204 includes multiple metablocks 206, 216. The metablock 206 is depicted as including memory blocks 208, 210, 212, and 214. The metablock 216 includes memory blocks 218, 220, 222, and 224.

As described herein, a fault assessment system 236, or module, determines if one or more of the memory blocks 208, 210, 212, and 214 of a metablock 206 are bad. In a first assessment, the fault assessment system 236 initiates a multiplane erase pass operation 238 on the metablock 206. In an example, the multiplane erase pass operation 238 simultaneously checks each memory block 208, 210, 212, and 214 to see if an erase function is successfully accomplished. In another example, the fault assessment system 236 implements or initiates a single planar test, which may check each memory block sequentially. A garbage collection operation 234 may also be included within the memory 204 for execution by the processors 202 during system downtime.

The memory 204 includes the retry pool 226. In an example, the retry pool 226 includes a plurality of memory blocks 228, 230, and 232. The memory blocks 228, 230, and 232 may have formally been part of a metablock that registered more than one erase pass operation failures. For example, each of the memory blocks 228, 230 and 232 may have been part of one, or multiple different metablocks in which one of the memory blocks had failed. As such, these memory blocks are in the retry pool 226 waiting to be logically assigned to another metablock.

In an example, the memory blocks 228, 230, and 232 may be individually assessed for a defect (e.g., using the fault assessment system 236). A memory block that passes the erase pass operation 238 may be processed using a relinking system 240. When the memory block passes, the memory block is individually relinked or otherwise made ready to be reused in another metablock to store data. For instance, the system 200 combines memory blocks from the retry pool 226 to form new metablocks 244. For instance, pooled memory blocks are promoted and combined (e.g., in groups of four) to form a new metablock. In one example, a memory table 242 that includes information indicating what data is stored and at what address is updated with the retired and relinked memory blocks, including those integrated into new metablocks.

Figure 3:
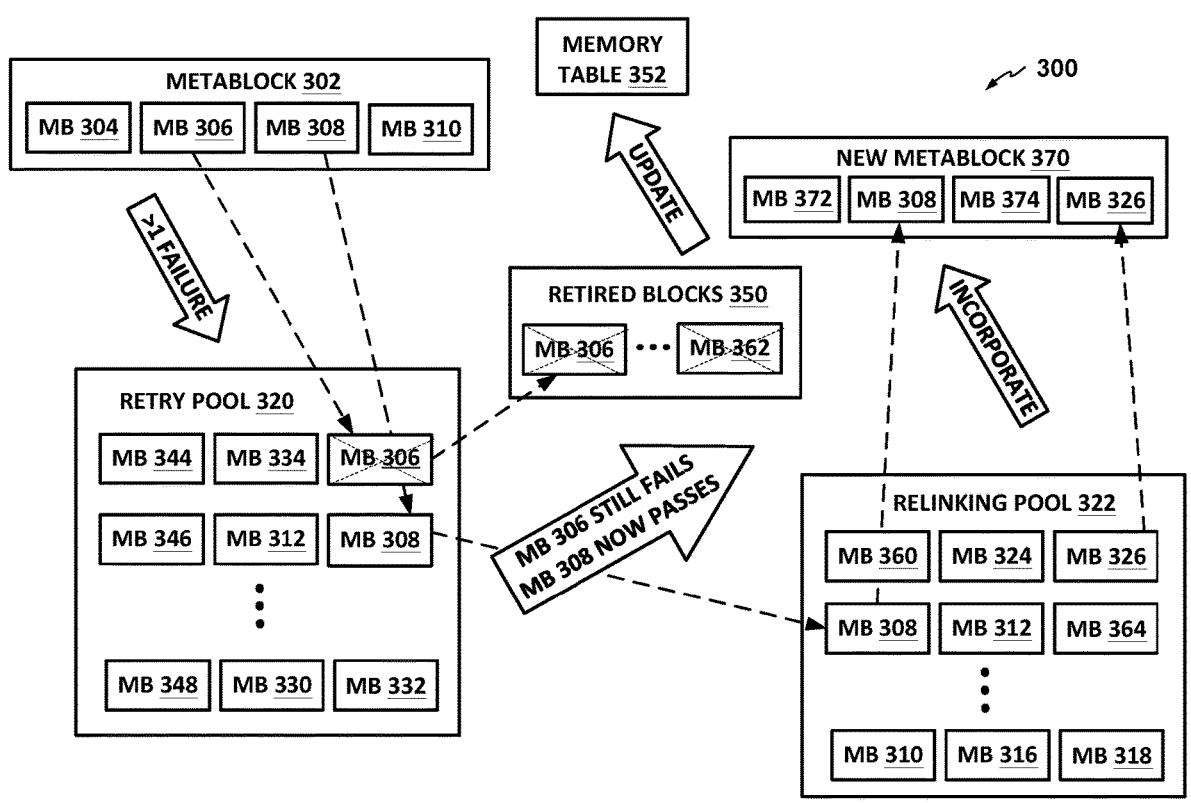
FIG. 3 is a block diagram of a system depicting a sequence of managing memory blocks using a retry pool to recover blocks that have been erroneously as being bad according to an example.

FIG. 3 is a block diagram of a system 300 depicting a sequence of managing memory blocks using a retry pool 320 to recover blocks that have been erroneously as being bad according to an example. In an example, the processes of the system 300 are initiated when a metablock 302 includes at least one memory block that fails to pass an erase operation, such as a multiplane erase operation.

For example, the metablock 302 includes four memory blocks 304, 306, 308, and 310. A first fault assessment may be performed on the metablock 302. For instance, a multiplane erase pass operation may be performed on the metablock 302 to determine whether any of the memory blocks 304, 306, 308 and 310 have failed. In this example, the results of the multiplane erase pass operation indicate that memory blocks 306 and/or 308 have failed and may thus be faulty. However, one or more of the detected faults may be erroneous. For instance, a memory block 306 may be legitimately faulty due to a physical defect and its presence may cause a neighboring (and functioning) memory block 308 to be initially, erroneously assessed or classified as being faulty.

Because more than one of the memory blocks 304, 306, 308, and 310 were assessed as being faulty, the assessed-to-be-faulty memory blocks 306, 308 are assigned to a retry pool 320. In another example, all of the memory blocks 304, 306, 308, and 310 are assigned the retry pool. A second fault assessment test may be executed on the memory blocks within the retry pool 320. An example of the second fault assessment includes a single plane error pass operation that individually attempts to erase each memory block. In an example, if the erase operation cannot be completed, the second fault assessment has failed.

As depicted in FIG. 3, the memory block 306 is confirmed to be bad and is retired in retired blocks 350. However, the memory block 308 passes the test while at the retry pool 320 and is subsequently assigned to a relinking pool 322. Pooled memory blocks of an example are recombined with other pooled memory blocks (e.g., typically from other former, different metablocks) to form a new metablock 370. The results of the relinking, retirement, and new metablock formation may be used to update a memory table 352.

Figure 4:
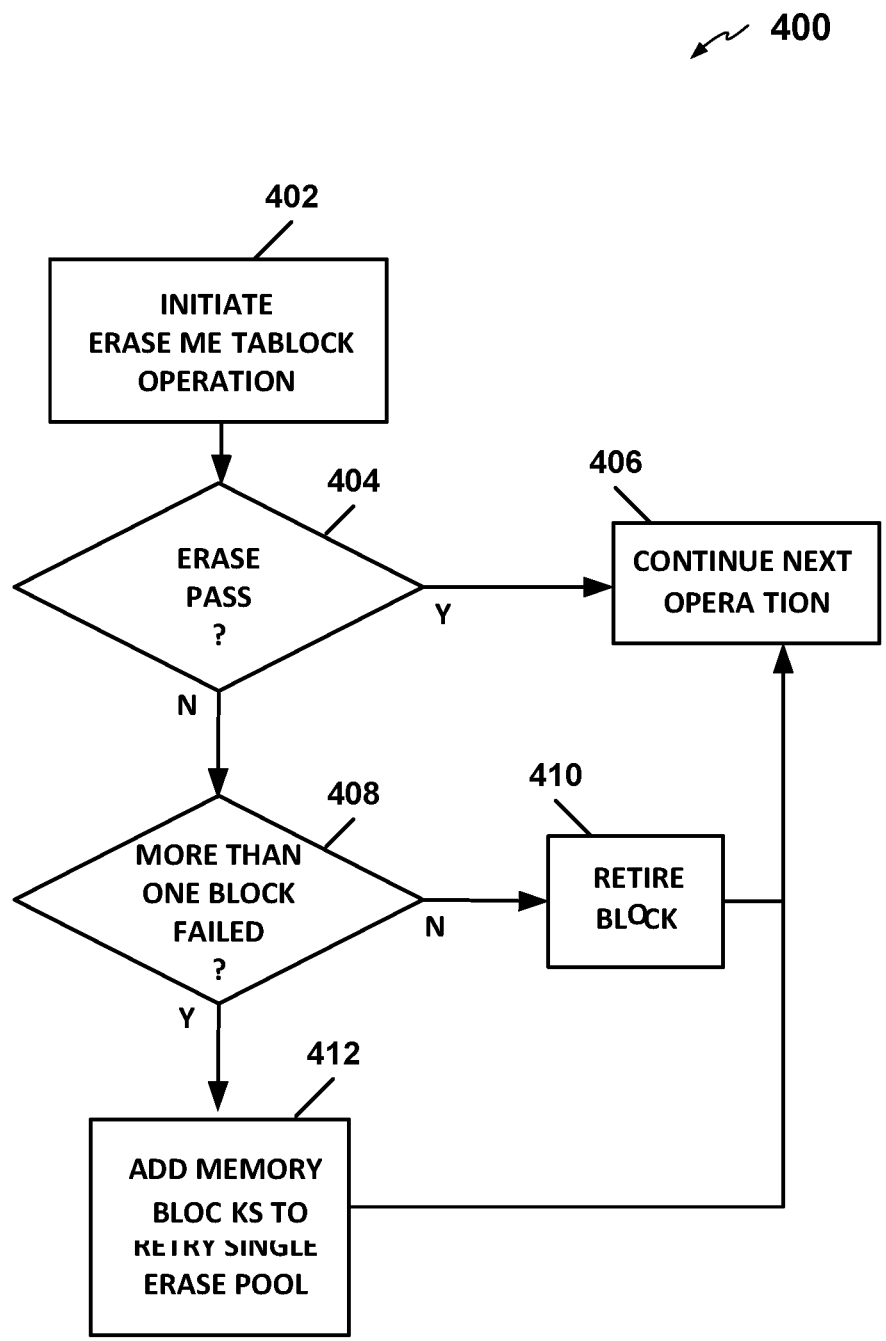
FIG. 4 illustrates a method of performing an erase operation, such as a multiplanar erase operation on a metablock according to an example.

FIG. 4 illustrates a method 400 of performing an erase operation, such as a multiplanar erase operation on a metablock according to an example. The method 400 may be performed by another of the preceding systems 100, 200, 300 of FIGS. 1-3. The erase operation of the method 400 may be performed as a foreground function of an operating system (e.g., receiving user input to initiate the erase operation).

Turning more particularly to the flowchart, the method 400 begins when an erase metablock operation (402) is initiated. For example, the erase pass operation 238 of FIG. 2 may be executed on the metablock 206. In one example, the erase pass operation includes a multiplanar erase pass function.

A determination (404) is made as to whether the metablock passes the fault assessment. If so, the operations continue (406). For instance, another metablock, such as the metablock 216 of FIG. 2, may be selected for analysis or be selected as part of another operation.

However, if it is determined (404) that the metablock (or one or more memory blocks of the metablock) has failed the fault assessment, another determination (408) is made as to whether more than one memory block has failed. If only one memory block has failed the initial erase pass operation, the memory block is retired (410).

However, if it is determined (408) that more than one memory block has failed, the failed memory blocks (or all of the memory blocks of the metablock) are assigned to, or are otherwise associated with, the a retry single erase pool. For example, the memory blocks 306 and 308 of FIG. 3 may be linked to the retry pool 320. Additional operations (406) may then be executed.

Figure 5:
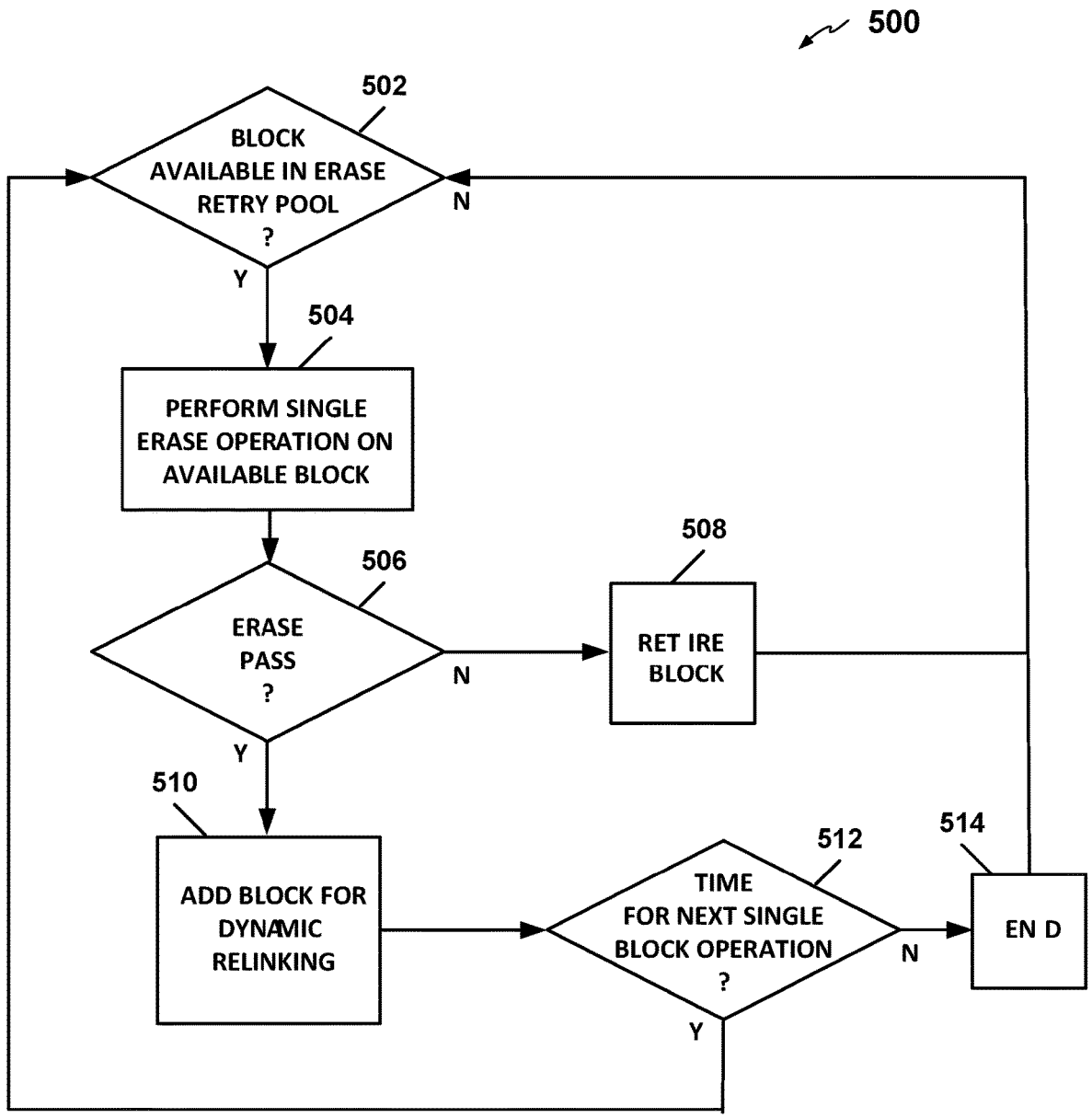
FIG. 5 illustrates a method of performing a garbage collection operation according to an example.

FIG. 5 illustrates a method 500 of performing a garbage collection operation according to an example. The method 500 may be performed by another of the preceding systems 100, 200, 300 of FIGS. 1-3. As described herein, the garbage collection operation of the illustrative method 500 may be executed as a background process.

In an example, the method 500 includes a determination (502) as to whether a memory block is available in an erase retry pool. The retry pool may be the erase pool to which the failed blocks were assigned at 412 of FIG. 4. In another example, the retry pool 320 may be checked to see if any memory blocks are available to be assessed and/or if over a threshold amount of memory blocks are available for assessment.

For example, the threshold may be any number of memory blocks that are needed to form a metablock and/or be based on a determined number of mischaracterized failures and/or correctly analyzed failures. For example, the metablock typically includes four memory blocks. However, if the controller determines that one out of every four memory blocks in the retry have failed, the threshold may be five memory blocks (or more).

In some examples, a controller may dynamically alter the threshold based, at least in part, on an operating state of the data storage device. For example, if over a threshold amount of memory blocks have been identified as faulty, the threshold may be lowered to help ensure that more memory blocks are potentially recovered. In another example, the threshold may be based, at least in part, on an available storage capacity of the data storage device. For example, as capacity decreases, the threshold may be lowered to help ensure any available storage space may be utilized.

In an example, if it is determined that the erase retry pool is empty or has below the threshold amount of memory blocks, the method 500 ends. However, if it is determined that at least one memory block is in the erase retry pool (or over the threshold amount of memory blocks are in the erase retry pool) a single erase operation (or other assessment) is executed on the available memory block queued in the erase retry pool. For example, the erase pass operation 238 of FIG. 2 may be executed on the pooled memory block 228 of the retry pool 226.

The controller then determines (506) whether the memory block has passed the erase pass operation. If not, the memory block is retired (508). For instance, the memory block 306 of the retry pool 320 of FIG. 3 may be retired at block 350.

However, if the controller determines (506) that the memory block has passed the erase pass, the memory block is added (510) to a dynamic relinking pool and/or a relinking operation is initiated. For example, the memory block 308 may be reassigned from the retry pool of FIG. 3 to the dynamic relinking pool 322.

Because the method 500 may execute the garbage collection operation as a background process, the controller may also determine (512) whether the system has enough downtime available (e.g., before a foreground processes initiate) to perform a next fault assessment on another memory block of the retry pool. For example, the controller may determine whether the system will remain idle for a long enough time to perform the fault assessment. If so, the method 500 is repeated and another memory block in the erase retry pool is selected. In this manner, the system of an implementation may sequence through blocks of the retry pool so long as enough time is available during the garbage collection operation. If the controller determines there is not enough time, the method 700 ends (514).

Figure 6:
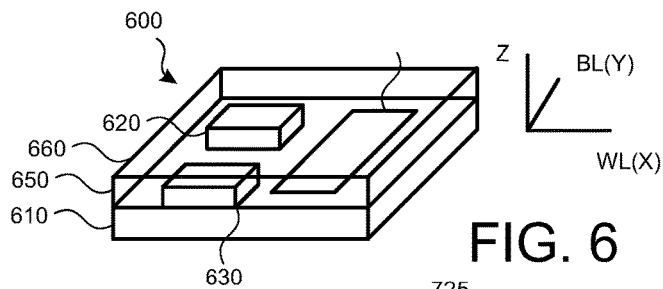
FIG. 6 is a perspective view of a storage device that includes three-dimensional (3D) stacked non-volatile memory according to an example.
Figure 7:
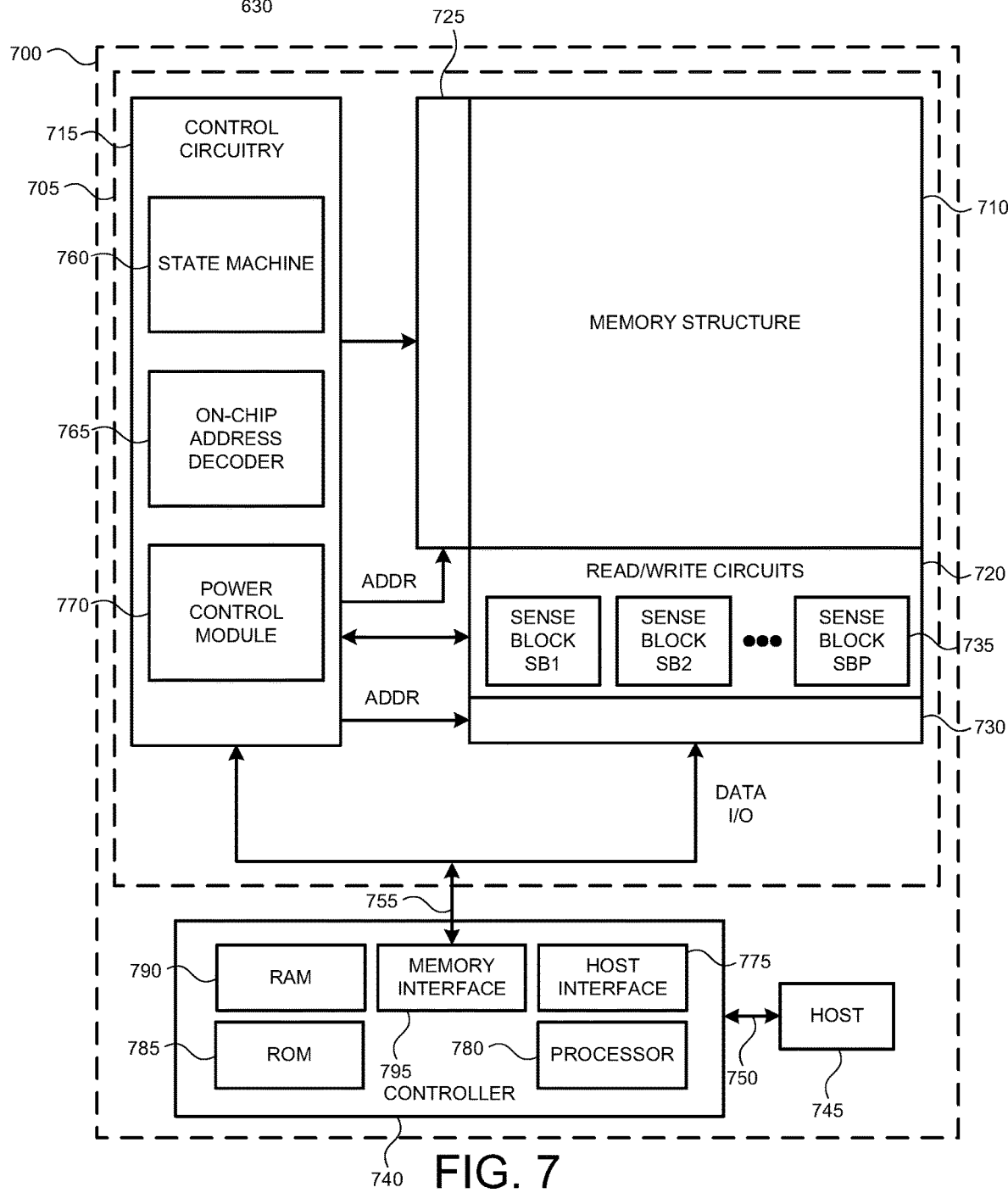
FIG. 7 is a block diagram of a storage device according to an example.

FIG. 6-FIG. 7 describe example storage devices that may be used with or otherwise implement the various features described herein. For example, the storage devices shown and described with respect to FIG. 6-FIG. 7 may include various systems and components that are similar to the systems and components shown and described with respect to FIG. 1. For example, the controller 722 shown and described with respect to FIG. 7 may be similar to the controller 110 of FIG. 1. Likewise, the memory dies 708 may be similar to the first memory dies 120 of FIG. 1.

FIG. 6 is a perspective view of a storage device 600 that includes three-dimensional (3D) stacked non-volatile memory according to an example. In this example, the storage device 600 includes a substrate 610. Blocks of memory cells are included on or above the substrate 610. The blocks may include a first block (BLK0 620) and a second block (BLK1 630). Each block may be formed of memory cells (e.g., non-volatile memory elements). The substrate 610 may also include a peripheral area 640 having support circuits that are used by the first block and the second block.

The substrate 610 may also carry circuits under the blocks, along with one or more lower metal layers which are patterned in conductive paths to carry signals from the circuits. The blocks may be formed in an intermediate region 650 of the storage device 600. The storage device may also include an upper region 660. The upper region 660 may include one or more upper metal layers that are patterned in conductive paths to carry signals from the circuits. Each block of memory cells may include a stacked area of memory cells. In an example, alternating levels of the stack represent word lines. While two blocks are depicted, additional blocks may be used and extend in the x-direction and/or the y-direction.

In an example, a length of a plane of the substrate 610 in the x-direction represents a direction in which signal paths for word lines or control gate lines extend (e.g., a word line or drain-end select gate (SGD) line direction) and the width of the plane of the substrate 610 in the y-direction represents a direction in which signal paths for bit lines extend (e.g., a bit line direction). The z-direction represents a height of the storage device 600.

FIG. 7 is a functional block diagram of a storage device 700 according to an example. In an example, the storage device 700 may be the 3D stacked non-volatile storage device 600 shown and described with respect to FIG. 6. The components depicted in FIG. 7 may be electrical circuits. In an example, the storage device 700 includes one or more memory dies 705. Each memory die 705 includes a three-dimensional memory structure 710 of memory cells (e.g., a 3D array of memory cells), control circuitry 715, and read/write circuits 720. In another example, a two-dimensional array of memory cells may be used. The memory structure 710 is addressable by word lines using a first decoder 725 (e.g., a row decoder) and by bit lines using a second decoder 730 (e.g., a column decoder). The read/write circuits 720 may also include multiple sense blocks 735 including SB1, SB2, . . . , SBp (e.g., sensing circuitry) which allow pages of the memory cells to be read or programmed in parallel. The sense blocks 735 may include bit line drivers.

In an example, a controller 740 is included in the same storage device 700 as the one or more memory dies 705. In another example, the controller 740 is formed on a die that is bonded to a memory die 705, in which case each memory die 705 may have its own controller 740. In yet another example, a controller die controls all of the memory dies 705.

Commands and data may be transferred between a host 745 and the controller 740 using a data bus 750. Commands and data may also be transferred between the controller 740 and one or more of the memory dies 705 by way of lines 755. In one example, the memory die 705 includes a set of input and/or output (I/O) pins that connect to lines 755.

The memory structure 710 may also include one or more arrays of memory cells. The memory cells may be arranged in a three-dimensional array or a two-dimensional array. The memory structure 710 may include any type of non-volatile memory that is formed on one or more physical levels of arrays of memory cells having an active area disposed above a silicon substrate. The memory structure 710 may be in a non-volatile memory device having circuitry associated with the operation of the memory cells, whether the associated circuitry is above or within the substrate.

The control circuitry 715 works in conjunction with the read/write circuits 720 to perform memory operations (e.g., erase, program, read, and others) on the memory structure 710. The control circuitry 715 may include registers, ROM fuses, and other devices for storing default values such as base voltages and other parameters.

The control circuitry 715 may also include a state machine 760, an on-chip address decoder 765 and a power control module 770. The state machine 760 may provide chip-level control of various memory operations. The state machine 760 may be programmable by software. In another example, the state machine 760 does not use software and is completely implemented in hardware (e.g., electrical circuits).

The on-chip address decoder 765 may provide an address interface between addresses used by host 745 and/or the controller 740 to a hardware address used by the first decoder 725 and the second decoder 730.

The power control module 770 may control power and voltages that are supplied to the word lines and bit lines during memory operations. The power control module 770 may include drivers for word line layers in a 3D configuration, select transistors (e.g., SGS and SGD transistors) and source lines. The power control module 770 may include one or more charge pumps for creating voltages.

The control circuitry 715, the state machine 760, the on-chip address decoder 765, the first decoder 725, the second decoder 730, the power control module 770, the sense blocks 735, the read/write circuits 720, and/or the controller 740 may be considered one or more control circuits and/or a managing circuit that perform some or all of the operations described herein.

In an example, the controller 740, is an electrical circuit that may be on-chip or off-chip. Additionally, the controller 740 may include one or more processors 780, ROM 785, RAM 790, memory interface 795, and host interface 775, all of which may be interconnected. In an example, the one or more processors 780 is one example of a control circuit. Other examples can use state machines or other custom circuits designed to perform one or more functions. Devices such as ROM 785 and RAM 790 may include code such as a set of instructions. One or more of the processors 780 may be operable to execute the set of instructions to provide some or all of the functionality described herein.

Alternatively or additionally, one or more of the processors 780 may access code from a memory device in the memory structure 710, such as a reserved area of memory cells connected to one or more word lines. The memory interface 795, in communication with ROM 785, RAM 790, and one or more of the processors 780, may be an electrical circuit that provides an electrical interface between the controller 740 and the memory die 705. For example, the memory interface 795 may change the format or timing of signals, provide a buffer, isolate from surges, latch I/O, and so forth.

The one or more processors 780 may issue commands to control circuitry 715, or any other component of memory die 705, using the memory interface 795. The host interface 775, in communication with the ROM 785, the RAM 795, and the one or more processors 780, may be an electrical circuit that provides an electrical interface between the controller 740 and the host 745. For example, the host interface 775 may change the format or timing of signals, provide a buffer, isolate from surges, latch I/O, and so on. Commands and data from the host 745 are received by the controller 740 by way of the host interface 775. Data sent to the host 745 may be transmitted using the data bus 750.

Multiple memory elements in the memory structure 710 may be configured so that they are connected in series or so that each element is individually accessible. By way of a non-limiting example, flash memory devices in a NAND configuration (e.g., NAND flash memory) typically contain memory elements connected in series. A NAND string is an example of a set of series-connected memory cells and select gate transistors.

A NAND flash memory array may also be configured so that the array includes multiple NAND strings. In an example, a NAND string includes multiple memory cells sharing a single bit line and are accessed as a group. Alternatively, memory elements may be configured so that each memory element is individually accessible (e.g., a NOR memory array). The NAND and NOR memory configurations are examples and memory cells may have other configurations.

The memory cells may be arranged in the single memory device level in an ordered array, such as in a plurality of rows and/or columns. However, the memory elements may be arrayed in non-regular or non-orthogonal configurations, or in structures not considered arrays.

In an example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, such as in the y direction) with each column having multiple memory cells. The vertical columns may be arranged in a two-dimensional arrangement of memory cells, with memory cells on multiple vertically stacked memory planes. Other configurations of memory elements in three dimensions can also constitute a 3D memory array.

In another example, in a 3D NAND memory array, the memory elements may be coupled together to form vertical NAND strings that traverse across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

Based on the above, examples of the present disclosure describe a data storage device, comprising: at least one memory die; and a controller communicatively coupled to the at least one memory die and configured to: access a metablock of the at least one memory die, wherein the metablock includes a plurality of memory blocks; determine whether two or more memory blocks of the plurality of memory blocks have failed a first fault assessment; based in part, on determining the two or more memory blocks have failed the first fault assessment, assign at least the two or more memory blocks of the plurality of memory blocks to a retry pool; perform a second fault assessment on the at least the two or more memory blocks of the plurality of memory blocks assigned to the retry pool; and make a fault determination on each of the at least the two or more memory blocks based, at least in part, on the second fault assessment. In an example, the controller is further configured to link at least one of the two or more memory blocks to another memory block to form a new metablock, wherein the relinking is based, at least in part, on the at least one of the two or more memory blocks passing the second fault assessment. In an example, the controller is further configured to retire at least one of the two or more memory blocks based, at least in part, on a determination that the at least one of the two or more memory blocks have failed the second fault assessment. In an example, the first fault assessment is a multiplane erase pass operation. In an example, the second fault assessment is a single plane erase pass operation. In an example, the first fault assessment is a foreground process. In an example, the controller is further configured to retire a memory block based, at least in part, on determining the memory block has failed the first assessment.

Other examples describe a data storage device, comprising: a means for accessing a metablock of at least one memory die, wherein the metablock includes a plurality of memory blocks; a means for determining whether at least two memory blocks of the plurality of memory blocks fail a first fault assessment; a means for assigning the at least two memory blocks of the plurality of memory blocks to a retry pool; a means for performing a second fault assessment on at least one memory block of the at least two memory blocks of the plurality of memory blocks assigned to the retry pool; and a means for making a fault determination of the at least one memory block of the at least two memory blocks. In an example, the data storage device also includes a means for relinking the at least one memory block of the at least two memory blocks memory block to another memory block as part of a relinking operation. In an example, the relinking operation is performed based, at least in part, on an operating state of the data storage device. In an example, the data storage device also includes a means for retiring the at least one memory block of the at least two memory blocks when the at least one memory block fails the second fault assessment. In an example, the first fault assessment is a multiplane erase pass operation. In an example, the second fault assessment is a single plane erase pass operation. In an example, the first fault assessment is a foreground process.

Examples also describe a method, comprising: assigning a plurality of memory blocks to a retry pool, wherein the plurality of memory blocks in the retry pool have failed a first test; performing a second test on the plurality of memory blocks assigned to the retry pool; and linking the plurality of memory blocks together to create one or more new metablocks, each of the one or more new metablocks including a set number of memory blocks, wherein the plurality of memory blocks are linked based, at least in part, on the second test. In an example, the method also includes retiring a least one memory block of the plurality of memory blocks when the at least one memory block fails the second test. In an example, the first test is a multiplane erase pass operation. In an example, the second test is a single plane erase pass operation. In an example, the method also includes determining whether the plurality of memory blocks fails the first test. In an example, the method also includes updating a memory table according to the one or more metablocks.

A person of ordinary skill in the art will recognize that the technology described herein is not limited to a single specific memory structure, but covers many relevant memory structures within the spirit and scope of the technology as described herein and as understood by one of ordinary skill in the art.

The description and illustration of one or more aspects provided in the present disclosure are not intended to limit or restrict the scope of the disclosure in any way. The aspects, examples, and details provided in this disclosure are considered sufficient to convey possession and enable others to make and use the best mode of claimed disclosure.

The claimed disclosure should not be construed as being limited to any aspect, example, or detail provided in this disclosure. Regardless of whether shown and described in combination or separately, the various features (both structural and methodological) are intended to be selectively rearranged, included or omitted to produce an example with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Aspects of the present disclosure have been described above with reference to schematic flowchart diagrams and/or schematic block diagrams of methods, apparatuses, systems, and computer program products according to examples of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute by way of the processor or other programmable data processing apparatus, create means for implementing the functions and/or acts specified in the schematic flowchart diagrams and/or schematic block diagrams block or blocks.

References to an element herein using a designation such as "first," "second," and so forth does not generally limit the quantity or order of those elements. Rather, these designations may be used as a method of distinguishing between two or more elements or instances of an element. Thus, reference to first and second elements does not mean that only two elements may be used or that the first element precedes the second element. Additionally, unless otherwise stated, a set of elements may include one or more elements.

Terminology in the form of "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As an additional example, "at least one of: A, B, or C" is intended to cover A, B, C, A-B, A-C, B-C, and A-B-C, as well as multiples of the same members. Likewise, "at least one of: A, B, and C" is intended to cover A, B, C, A-B, A-C, B-C, and A-B-C, as well as multiples of the same members.

Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

What is claimed is:

1. A data storage device, comprising:
   at least one memory die; and
   a controller communicatively coupled to the at least one memory die and configured to:
   access a metablock of the at least one memory die, wherein the metablock includes a plurality of memory blocks;
   determine whether two or more memory blocks of the plurality of memory blocks have failed a first fault assessment;
   based in part, on determining the two or more memory blocks have failed the first fault assessment, assign at least the two or more memory blocks of the plurality of memory blocks to a retry pool;
   perform a second fault assessment on the at least the two or more memory blocks of the plurality of memory blocks assigned to the retry pool; and
   make a fault determination on each of the at least the two or more memory blocks based, at least in part, on the second fault assessment.

2. The data storage device of claim 1, wherein the controller is further configured to link at least one of the two or more memory blocks to another memory block to form a new metablock, wherein the relinking is based, at least in part, on the at least one of the two or more memory blocks passing the second fault assessment.

3. The data storage device of claim 1, wherein the controller is further configured to retire at least one of the two or more memory blocks based, at least in part, on a determination that the at least one of the two or more memory blocks have failed the second fault assessment.

4. The data storage device of claim 1, wherein the first fault assessment is a multiplane erase pass operation.

5. The data storage device of claim 1, wherein the second fault assessment is a single plane erase pass operation.

6. The data storage device of claim 1, wherein the first fault assessment is a foreground process.

7. The data storage device of claim 1, wherein the controller is further configured to retire a memory block based, at least in part, on determining the memory block has failed the first fault assessment.

8. A data storage device, comprising:
   a means for accessing a metablock of at least one memory die, wherein the metablock includes a plurality of memory blocks;
   a means for determining whether at least two memory blocks of the plurality of memory blocks fail a first fault assessment;
   a means for assigning the at least two memory blocks of the plurality of memory blocks to a retry pool;
   a means for performing a second fault assessment on at least one memory block of the at least two memory blocks of the plurality of memory blocks assigned to the retry pool; and
   a means for making a fault determination of the at least one memory block of the at least two memory blocks.

9. The data storage device of claim 8, further comprising a means for relinking the at least one memory block of the at least two memory blocks to another memory block as part of a relinking operation.

10. The data storage device of claim 9, wherein the relinking operation is performed based, at least in part, on an operating state of the data storage device.

11. The data storage device of claim 8, further comprising a means for retiring the at least one memory block of the at least two memory blocks when the at least one memory block fails the second fault assessment.

12. The data storage device of claim 8, wherein the first fault assessment is a multiplane erase pass operation.

13. The data storage device of claim 8, wherein the second fault assessment is a single plane erase pass operation.

14. The data storage device of claim 8, wherein the first fault assessment is a foreground process.

15. A method, comprising:
- assigning a plurality of memory blocks to a retry pool, wherein the plurality of memory blocks in the retry pool have failed a first test;
- performing a second test on the plurality of memory blocks assigned to the retry pool; and
- linking the plurality of memory blocks together to create one or more new metablocks, each of the one or more new metablocks including a set number of memory blocks, wherein the plurality of memory blocks are linked based, at least in part, on the second test.

16. The method of claim 15, further comprising retiring at least one memory block of the plurality of memory blocks when the at least one memory block fails the second test.

17. The method of claim 15, wherein the first test is a multiplane erase pass operation.

18. The method of claim 15, wherein the second test is a single plane erase pass operation.

19. The method of claim 15, further comprising determining whether the plurality of memory blocks fails the first test.

20. The method of claim 15, further comprising updating a memory table according to the one or more metablocks.

* * * * *